United States Patent
Bardwell

(10) Patent No.: US 8,227,036 B2
(45) Date of Patent: Jul. 24, 2012

(54) METHOD OF MAKING A HEATER STRUCTURE AND A HEATER STRUCTURE

(75) Inventor: Anthony Bardwell, Luton (GB)

(73) Assignee: GKN Aerospace Services Limited, Isle of Wight (GB)

(*) Notice: Subject to any disclaimer, the term of this patent is extended or adjusted under 35 U.S.C. 154(b) by 258 days.

(21) Appl. No.: 12/293,136

(22) PCT Filed: Mar. 16, 2007

(86) PCT No.: PCT/GB2007/000933
§ 371 (c)(1),
(2), (4) Date: Jan. 23, 2009

(87) PCT Pub. No.: WO2007/107713
PCT Pub. Date: Sep. 27, 2007

(65) Prior Publication Data
US 2009/0176083 A1    Jul. 9, 2009

(30) Foreign Application Priority Data
Mar. 17, 2006    (GB) .................................. 0605453.0

(51) Int. Cl.
*B05B 5/00* (2006.01)
*H05B 3/00* (2006.01)
*B64D 15/12* (2006.01)

(52) U.S. Cl. ......................................................... 427/288

(58) Field of Classification Search ............... 427/402, 427/404, 409, 282, 256, 288
See application file for complete search history.

(56) References Cited

U.S. PATENT DOCUMENTS

| 2,750,321 A | * | 6/1956 | Koppelman | 343/873 |
| 2,791,668 A | | 5/1957 | Cowdrey et al. | |
| 4,816,124 A | * | 3/1989 | Manabe et al. | 204/192.14 |

FOREIGN PATENT DOCUMENTS

| GB | 832 777 A | | 4/1960 |
| GB | 832 778 A | | 4/1960 |
| GB | 833 675 A | | 4/1960 |
| GB | 832778 | * | 4/1960 |
| GB | 1 201 191 A | * | 8/1970 |
| GB | 2 121 745 A | | 1/1984 |

(Continued)

OTHER PUBLICATIONS

Definition of "porous" retrieved from http://merriam-webster.com/dictionary/porous on Jul. 20, 2011; 2 pages.*

(Continued)

*Primary Examiner* — William Phillip Fletcher, III
(74) *Attorney, Agent, or Firm* — Quarles & Brady LLP

(57) ABSTRACT

A method of making a heater structure and a corresponding heater structure are disclosed. The method comprises providing a porous reinforcement material such as glass cloth, applying a metal to the porous reinforcement material such as by spraying and applying resin to the porous reinforcement material with metal already applied thereto to make the structure substantially rigid. Applying the metal to the porous reinforcement material before applying the resin provides a number of advantages such as enhanced shear strength between the porous reinforcement material and the applied metal layer and the ability to manipulate the porous reinforcement material with metal applied thereto prior to applying the resin. The heater structure may be used in many applications, some of which arc described.

13 Claims, 3 Drawing Sheets

FOREIGN PATENT DOCUMENTS

JP 01-171300 A * 7/1989

OTHER PUBLICATIONS

International Search Report and Written Opinion under date of Aug. 7, 2007 issued by the European Patent Office corresponding to PCT/GB2007/000933.

Response to Written Opinion of Aug. 7, 2007, submitted by Anthony J. Albutt under date of Feb. 20, 2008 in connection with PCT/GB2007/000933.

[Second] Written Opinion of the International Preliminary Examining Authority under date of Mar. 19, 2008 submitted by the European Patent Office corresponding to PCT/GB2007/000933.

Response to [Second] Written Opinion of Mar. 19, 2008, submitted by Anthony J. Albutt under date of May 16, 2008 in connection with PCT/GB2007/000933.

International Preliminary Report on Patentability under date of Jun. 10, 2008 issued by the European Patent Office corresponding to PCT/GB2007/000933.

* cited by examiner

METHOD OF MAKING A HEATER STRUCTURE AND A HEATER STRUCTURE

CROSS REFERENCE TO RELATED APPLICATIONS

This application represents the national stage application of International Application PCT/GB2007/000933 filed Mar. 16, 2007, which claims the benefit of Great Britain Patent Application 0605453.0, filed Mar. 17, 2006, which is incorporated herein by reference in its entirety for all purposes.

The present invention relates to a method of making a heater structure and to a corresponding heater structure. Heater structures may be used in many applications. For example they may be used in aircraft components and structures, in particular in external surfaces of aircraft such as wings, air intakes and rotor blades. They could be used wherever a heater is required such as car wing mirrors, seat heaters, railway trains, carriage heaters and heaters for railway tracks and points. The heaters may be used to provide a de-icing function.

The existing method to make heater structures is by first providing a structural layer. The structural layer generally comprises a reinforcement material such as glass cloth which is cured with resin to make it rigid. The rigid resin cured glass cloth is then grit blasted to remove some of the resin on the outer surface to expose some glass cloth underneath. A metal spray such as a copper alloy is then applied to the exposed glass cloth surface to form a metal layer which sticks to the exposed glass cloth. The resin cured glass cloth may be masked such that the metal layer forms a suitable pattern to be used as a heater element. The heater element is then connected to a suitable electrical supply to form an electrical circuit such that in use, the metal layer acting as a heater element generates heat by virtue of it's electrical resistance. The resultant heater structure may be used in any desirable application such as an external surface of an aircraft for example to provide a de-icing function.

However, there are a number of aspects of this conventional method which it would be advantageous to improve.

For example it would be desirable to not have to grit blast the surface of the resin cured glass cloth as this can weaken and damage the structure in order to improve the heater durability and extend service life. It would also be desirable to improve the bond between the sprayed metal layer and the grit blasted resin cured glass cloth.

It would also be desirable to be able to use a number of different types of metal and methods of applying the metal. Different types of metal or alloys will allow a wider range of resistances and the ability to use some metal's special properties. In the conventional method of applying the metal layer, using for example a spray gun, the temperature of the metal spray must be kept suitably low so as not to melt the resin in the cured resin glass cloth. This temperature restriction limits the metal application to relatively low temperature processes which in turn limits the range of metals which may be used.

Furthermore, in the conventional method the shape of the rigid resin cured glass cloth must be formed before the metal is applied. This shape often includes a number of curves and bends to fit it to the aircraft outer surface such as a wing or rotor blade. It is a time consuming task to ensure that the subsequently applied metal layer is of a substantially constant thickness over the curves and bends to ensure a substantially constant supply of heat is supplied over the surface.

Busbars are provided in conventional multi-layer structures between various layers to allow internal electrical connection. The busbars conventionally comprise metal strips, typically made from beryllium and copper, and are pre-moulded into the base layers of the structure so that their position is stabilised prior to the application of the metal spray. However the provision of these busbars is relatively expensive, difficult and labour intensive.

According to a first aspect of the present invention there is provided a method of making a heater structure, the method comprising:
providing a porous reinforcement material;
applying a metal or metal alloy to the porous reinforcement material such that at least a portion of the applied metal is absorbed into the porous reinforcement material and then:
applying resin to the porous reinforcement material with metal already applied thereto.

By applying the metal to the porous reinforcement material such as glass cloth before applying the resin to make the structure rigid, the method does not require any grit blasting and so the fatigue life of the structure is likely to be improved.

Furthermore, as the metal is applied to the porous reinforcement material such as glass cloth before the resin is applied, the metal is likely to be absorbed into the pores of the reinforcement materials far more readily than in the conventional method in which the metal generally forms a layer on top of the grit blasted surface of the resin cured glass cloth. The metal may be sprayed onto the porous reinforcement material. The metal may be absorbed at least 25 μm or at least 50 μm into the porous reinforcement material. This makes the metal application process, using a spray for example, far easier to control in terms of uniformity and overall resistances. This then lends itself to easier automation of the metal application process and enables higher temperature metal application methods to be used as there is no resin to melt. Moreover, heater structures made by this method are likely to have better shear strength than structures made by the conventional method as the metal is likely to be more readily absorbed into the glass cloth pores rather than simply forming a layer on top of the grit blasted resin cured glass cloth as in the conventional method.

It is also possible to manipulate the reinforcement material with metal applied thereto into suitable shapes with curves, bends and three-dimensional curves prior to the application of resin to make the structure rigid. The structure may, for example, have metal applied whilst the reinforcement material is flat to ensure a substantially constant thickness of metal is applied and then manipulated into the desired shape prior to the application of resin to make it rigid. Alternatively, it is also possible to provide the reinforcement material into a suitable shape, such as any desirable three dimensional or double curved shape, and then apply the metal to the reinforcement material in the pre-formed shape and then apply the resin. This enables complex shaped heater structures to be formed. The reinforcement material may be manipulated into the desired shape using a mould.

Busbars may be provided between heater structures to form a multi-layered heater mat. The busbars may comprise strips of porous reinforcement material such as glass cloth strips with metal applied thereto. The use of such busbars enables a heater structure or mat to be made in which the structure and busbars have resin applied together making a simpler and less expensive method than that of the conventional process.

Embodiments of the present invention will now be described by way of example with reference to the accompanying drawing in which.

Figure 1:
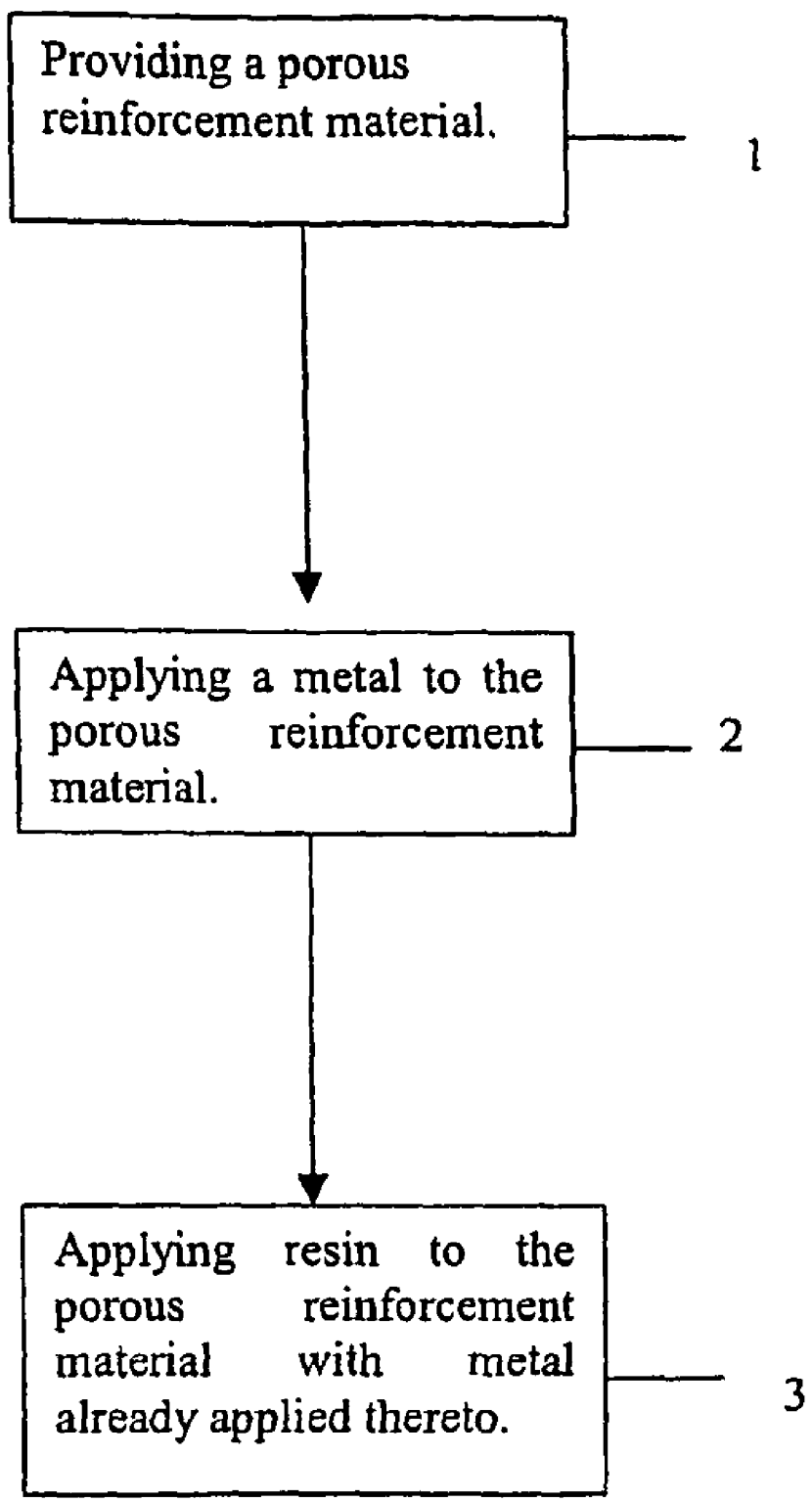
FIG. 1 is a flow diagram illustrating an embodiment of the method of the present invention.

As shown in FIG. 1 and as described above, a method of making a heater structure comprises providing a porous reinforcement material 1, applying a metal to the porous reinforcement material 2 and then applying resin to the porous reinforcement material with metal already applied thereto 3.

The porous reinforcement material may take any suitable form such as woven glass cloth or woven ceramic for example.

Metal may be applied to the porous reinforcement material by any suitable method as is well known in the art such as by spraying. Metal spraying may be accomplished in a number of ways such as by progressively melting a copper alloy wire in a propane/oxygen flame such that the resulting molten material is broken up and projected onto the porous reinforcement material by a compressed air steam. Other processes such as arc spraying that produce sprayable metal can be used to melt and spray almost any metal onto the porous reinforcement material. The limiting factor is likely to be the maximum temperature the porous reinforcement material will withstand, which can be relatively high when a woven ceramic is used.

As high temperature processes such as arc spraying may be used, many different types of metal may be applied to the porous reinforcement material. Metals may be selected with suitable characteristics, such as titanium to provide a greater coefficient of thermal resistance and thus more heating at lower ambient temperatures and a lower thermal resistance and thus less heating at higher ambient temperatures. This is in contrast to the conventional method where relatively low temperature methods of applying the metal to the resin coated glass cloth must be used so that the resin will not be melted thus limiting the range of metals that can be used.

The sprayed metal is typically absorbed at least 25 μm (1 mil which is 1 thousandth of an inch) and generally between 25 μm and 100 μm (1 mil and 4 mil) or more typically between 50 μm and 75 μm (2 mil and 3 mil) into the porous reinforcement material. The metal layer thus has much better shear strength than conventional metal layers which are essentially stuck to the exposed grit blasted surface of a resin coated glass cloth.

As the reinforcement material and applied metal are able to withstand relatively high temperatures, higher heater powers may be used up to a limit defined by the temperature which the resin system can withstand without melting. Furthermore, the method of applying metal to the porous reinforcement material may be the same for whatever resin application system is used. This is in contrast to conventional methods which often require different methods of applying the metal depending upon the resin system used.

Figure 2:
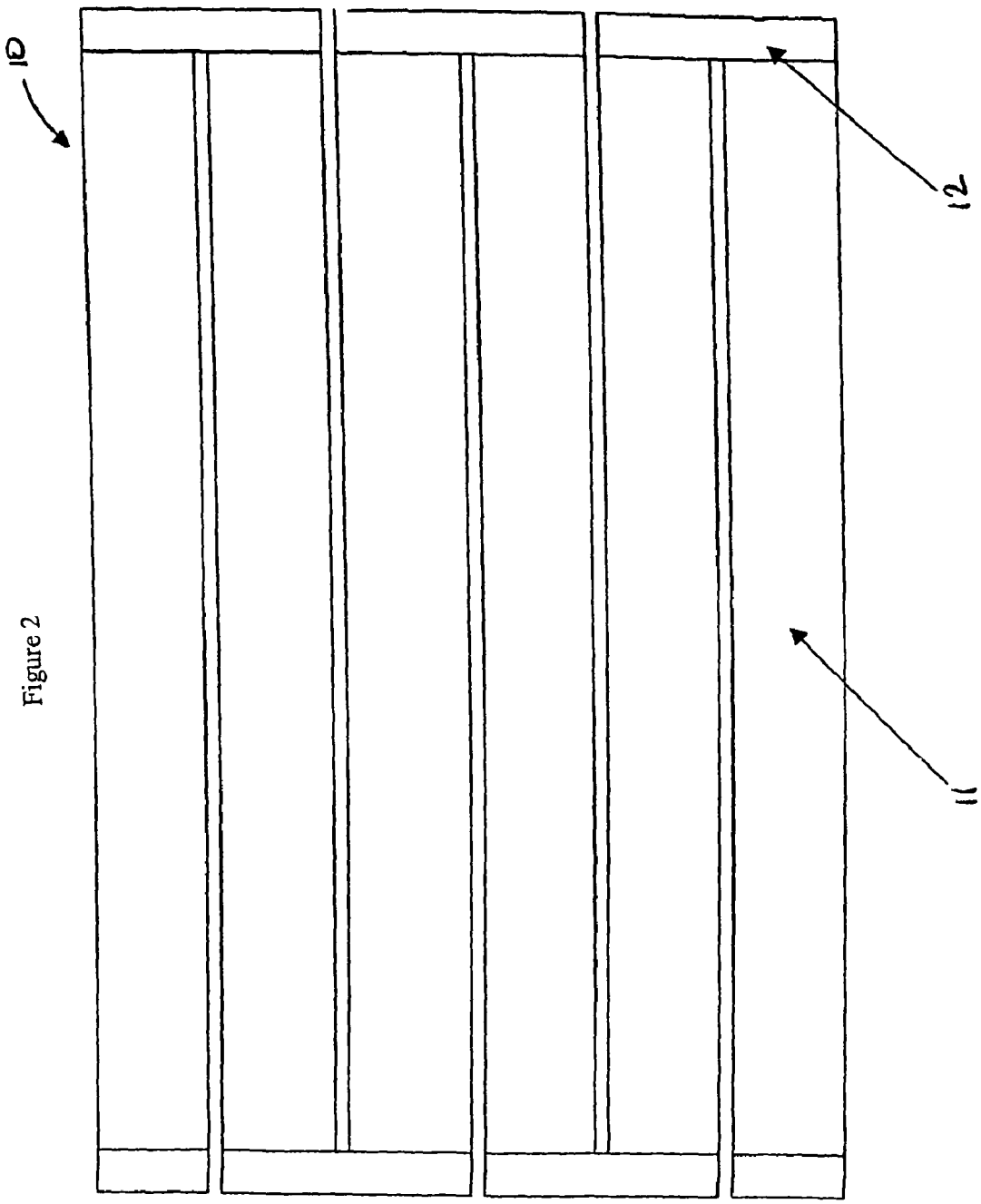
FIG. 2 is a plan view of a typical heater pattern.

During application of the metal, the porous reinforcement material can be masked by simple means as is well known in the art such that a heater element pattern is left exposed. Metal spray can be applied to the exposed reinforcement material pattern such that an even coating of metal results. With sufficient metal applied an electrically uniform strip of conducting material can be produced. FIG. 2 shows a plan view of a typical metal sprayed heater 10 formed using a mask. In this example the metal sprayed heater 10 comprises a number of relatively higher resistance conductors 11 connected to each other at their ends by relatively lower resistance conductors 12. The resulting electrical circuit can be powered by a suitable electrical supply in order to generate heat by virtue of the circuit resistance.

A metal-sprayed reinforcement material such as glass cloth has sufficient robustness to allow shape manipulation. This property allows the cloth to be sprayed in one shape condition such as when flat and then changed to another shape to be incorporated into a useful structure. A piece of glasscloth sprayed as a flat sheet can be manipulated by simple means such that it can be incorporated into any single curved shape such as a wing or rotor blade leading edge. Provided the metal sprayed surface is on the inside surface of the curve or radius it will effectively be in compression and this allows the system to be manipulated into very small radii such as less than 3 mm (0.125 inches).

A particular manufacturing benefit of this property is that the heater structure can be manufactured in a flat condition and then applied to a shaped structure. Heretofore metal spray has had to be applied to a pre-cured shape. Being able to spray a flat material and then apply it to a shaped structure and subsequently apply resin to make it rigid allows simpler mechanisation of the metal spray process. Such a property also allows the introduction of the heater system into a female or male moulding process. Existing metal spray processes are difficult to apply to the inside of a female moulding (especially with narrow leading edges) due to the size and nature of the metal spray equipment and the difficulty of being able to spray to required tolerances within the female moulding.

Alternatively, the reinforcement material may be provided in a suitable shape prior to application of metal and resin. The flexible reinforcement material such as day glasscloth may be pre-formed into a suitable shape such as any three dimensional or double curved shape using a mould. The metal and resin may then be applied to form the heater structure. Pre-forming the reinforcement material enables more complex heater structure shapes to be formed without any risk of damaging the metal heater element which could result from excessive manipulation of a metal sprayed reinforcement material.

Such a metal sprayed reinforcement layer may have resin applied to it by any suitable method known to those skilled in the art. Such methods may include resin infusion by means of incorporation into a "pre-preg" composite structure, by resin infusion by means of liquid resin injection by the resin transfer moulding (RTM) process or by resin infusion by means of the resin injection moulding (RIM) process for example.

Resin composites are generally a controlled mixture of hardenable liquid pre-polymers and some number of layers of reinforcement material. For electrical heater structures the layers of reinforcement are arranged in use to lie next to the metal sprayed heaters as they need to have electrical insulation properties. The other layers may be of any material as desired to suit the application.

The metal sprayed reinforcement material needs to be infused with the liquid resin system. For a cost effective and practical system the metal-sprayed reinforcement layer may be infused at the same time as the other parts of the composite structure.

Commercially available "pre-preg systems" are available that contain the required composite reinforcement and the required resin system in semi solid form. Such materials can be laid either side of the metal-sprayed reinforcement material in a manner consistent with normal procedures within the industry. The process to create a homogeneous composite structure generally requires the stack to be laid up on a suitable mould and to be held under vacuum with a suitable membrane, have external air pressure applied, and the temperature raised to liquefy and cure the resin system. Such a process is known throughout industry as an autoclave cure. During such a cure the liquid resin will infuse into the dry reinforcement material and metal spray system by means of capillary action.

Pre-preg resin infusion can also be accomplished by application of a heat and vacuum only process where the polymer properties permit.

The metal spray is inherently porous and this allows the resin system to penetrate and surround the applied particles. The end result of such an infusion process is a fully resin wetted composite structure incorporating a heater element.

Alternatively, a metal sprayed reinforcement layer can be provided in a stack of dry reinforcement materials in the manner as currently known in the industry as an RTM (resin transfer moulding) process. In this process the stack of reinforcement materials are placed into a closed mould and the liquid resin system is introduced either under pressure or by vacuum. During this process the reinforcement material and metal spray are fully infused producing a fully homogeneous structure.

Alternatively, a metal sprayed reinforcement layer can be provided in a stack of dry reinforcement materials in the manner as currently known in the industry as an RIM (resin injection moulding) process. In this process the stack of reinforcement materials are placed into a vacuum bag and the liquid resin system is introduced by vacuum. During this process the reinforcement material and metal spray are fully infused producing a fully homogeneous structure.

Figure 3:
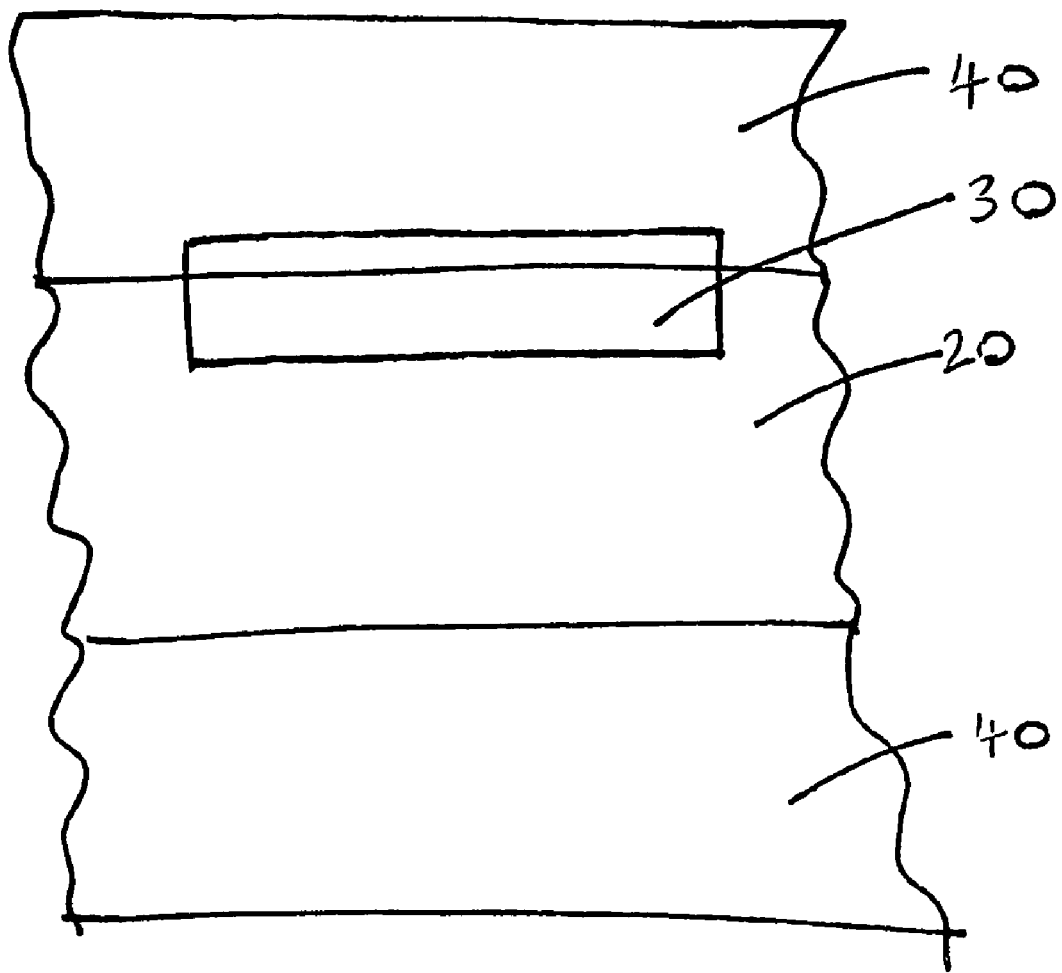
FIG. 3 is an example of a heater structure made by the method illustrated in FIG. 1.

FIG. 3 shows an example of a heater structure made by the method described above. In this example the porous reinforcement material 20 is glass cloth and has had a metal layer 30 applied to it which has been absorbed approximately 50 μm to 75 μm (2 to 3 mil) into the porous reinforcement material 20. The porous reinforcement material 20 with metal applied thereto may then be manipulated to any desired shape for subsequent use (not shown). Alternatively, the porous reinforcement material may have been manipulated into any desired shape prior to the application of the metal layer 30. Resin 40 is then applied to the porous reinforcement material 20 with metal applied thereto to make it rigid. The resin 40 encapsulates the porous reinforcement material 20 with metal applied thereto. In use the metal layer in the form of a heater element is connected to a power supply (not shown) to enable the structure to be heated.

Many variations may be made to the examples described above whilst still falling within the scope of the invention. For example any suitable porous reinforcement material may be used and the metal and resin may be applied by any suitable method. The heater structure may be used in any desired application. For example it may be used in an aircraft, such as in an external surface such as a wing, air intake or rotor blade. It could be used in a vehicle such as a vehicle wing mirror, a seat heater, a railway train, a carriage heater, an railway tracks or points for example.

The invention claimed is:

1. A method of making a heater structure, the method comprising:
   providing a porous reinforcement material that is a cloth;
   applying a metal to the porous reinforcement material to produce a resistance heating element pattern with the applied metal and such that at least a portion of the applied metal is absorbed into the porous reinforcement material;
   shaping the porous reinforcement material with the metal applied thereto; and then
   applying resin to the porous reinforcement material with metal already applied thereto wherein the metal, the porous reinforcement material, and the resin form the heater structure.

2. A method according to claim 1, wherein the metal is sprayed onto the porous reinforcement material.

3. A method according to claim 2, wherein the metal sprayed onto the porous reinforcement material is a metal alloy.

4. A method according to claim 1, wherein the metal is absorbed at least 25 μm into the porous reinforcement material.

5. A method according to claim 4, wherein the metal is absorbed at least 50 μm into the porous reinforcement material.

6. A method according to claim 1, wherein the porous reinforcement material is flat when the metal is applied to it.

7. A method according to claim 1, wherein the porous reinforcement material with metal already applied thereto is malleable prior to the application of resin.

8. A method according to claim 7, wherein the malleable porous reinforcement material with metal already applied thereto is formed into a curve with the metal on the inside of the curve and subsequently has resin applied.

9. A method according to claim 1, wherein the porous reinforcement material is pre-formed into a desired shape prior to the application of metal and resin.

10. A method according to claim 1, wherein the metal is applied to the porous reinforcement material at a temperature which is higher than the melting temperature of the subsequently applied resin.

11. A method according to claim 1, wherein the metal is applied to the porous reinforcement material using a mask such that the resulting pattern of metal acts as a heater element.

12. A method according to claim 1, wherein the cloth is a glass cloth.

13. A method according to claim 1, wherein the resistance heating element pattern has connections at the ends of the resistance heating element pattern adapted for connection to an electrical supply to form a circuit with the electrical supply such that, when in use, the resistance heating element pattern generates heat by electrical resistance.

* * * * *